(12) United States Patent
Park et al.

(10) Patent No.: US 10,911,510 B2
(45) Date of Patent: *Feb. 2, 2021

(54) APPARATUS AND METHOD FOR TRANSMITTING MULTIMEDIA DATA IN A BROADCAST SYSTEM

(71) Applicant: Samsung Electronics Co., Ltd., Suwon-si (KR)

(72) Inventors: Kyung-Mo Park, Seoul (KR); Sung-Oh Hwang, Yongin-si (KR); Jae-Yeon Song, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/654,472

(22) Filed: Oct. 16, 2019

(65) Prior Publication Data

US 2020/0053140 A1 Feb. 13, 2020

Related U.S. Application Data

(63) Continuation of application No. 16/148,140, filed on Oct. 1, 2018, now Pat. No. 10,484,445, which is a (Continued)

(51) Int. Cl.
*G06F 15/16* (2006.01)
*H04L 29/06* (2006.01)
(Continued)

(52) U.S. Cl.
CPC ....... *H04L 65/601* (2013.01); *H04N 21/2381* (2013.01); *H04N 21/4381* (2013.01);
(Continued)

(58) Field of Classification Search
CPC ..... H04L 67/06; H04L 65/607; H04L 65/601; H04N 21/4207; H04N 19/167; H04N 21/8455
(Continued)

(56) References Cited

U.S. PATENT DOCUMENTS 7,852,853 B1 12/2010 Black et al.
8,638,818 B2 1/2014 Hwang et al.
(Continued)

FOREIGN PATENT DOCUMENTS

CN 1728713 A 2/2006
CN 1774898 A 5/2006
(Continued)

OTHER PUBLICATIONS

Fukuhara et al.; Media Pro; JPEG2000/Motion/JPEG2000; JPEG2000 Detailed explanations; CQ Publishing Co., Ltd.; First Edition, Sep. 15, 2004; p. 228-233; Japan.
(Continued)

*Primary Examiner* — Wing F Chan
*Assistant Examiner* — Andrew Woo
(74) *Attorney, Agent, or Firm* — Jefferson IP Law, LLP

(57) ABSTRACT

An apparatus and a method for transmitting multimedia data in a broadcast system are provided. A method for constructing a payload for a multimedia frame to be transmitted via a heterogeneous network, in a broadcast system that supports an Internet protocol-based multimedia service, includes dividing the data so as to transmit data of at least one media type and constructing a data region based on each datum of the divided data, constructing a header region including information on the state of the data contained in the data region and/or information on the data region, and combining the data region and the header region to construct a payload for the multimedia frame.

2 Claims, 4 Drawing Sheets

Related U.S. Application Data continuation of application No. 13/980,462, filed as application No. PCT/KR2012/000468 on Jan. 19, 2012, now Pat. No. 10,104,144.

(51) Int. Cl.

| | | |
|---|---|---|
| *H04N 21/2381* | (2011.01) | |
| *H04N 21/438* | (2011.01) | |
| *H04N 21/643* | (2011.01) | |
| *H04N 21/6437* | (2011.01) | |
| *H04H 60/07* | (2008.01) | |
| *H04N 21/235* | (2011.01) | |

(52) U.S. Cl.
CPC ... *H04N 21/6437* (2013.01); *H04N 21/64322* (2013.01); *H04H 60/07* (2013.01); *H04N 21/235* (2013.01)

(58) Field of Classification Search
USPC .................................................. 709/230, 236
See application file for complete search history.

(56) References Cited

U.S. PATENT DOCUMENTS

| | | |
|---|---|---|
| 2004/0131014 A1 | 7/2004 | Thompson |
| 2005/0002525 A1 | 1/2005 | Alkove et al. |
| 2006/0036551 A1 | 2/2006 | Oliveira et al. |
| 2006/0072538 A1 | 4/2006 | Raith |
| 2006/0083236 A1 | 4/2006 | Rachwalski et al. |
| 2006/0184790 A1 | 8/2006 | Oliveira et al. |
| 2006/0251028 A1 | 11/2006 | Nagata et al. |
| 2006/0268855 A1 | 11/2006 | Brandt et al. |
| 2007/0086481 A1 | 4/2007 | Klemets |
| 2007/0195892 A1 | 8/2007 | Choi et al. |
| 2008/0040498 A1 | 2/2008 | Setlur et al. |
| 2008/0228472 A1 | 9/2008 | Park et al. |
| 2009/0034526 A1 | 2/2009 | Ahmadi et al. |
| 2009/0116490 A1 | 5/2009 | Charpentier et al. |
| 2009/0219990 A1 | 9/2009 | Han et al. |
| 2009/0296624 A1 | 12/2009 | Ryu et al. |
| 2010/0157904 A1 | 6/2010 | Ho et al. |
| 2010/0189182 A1 | 7/2010 | Hannuksela |
| 2010/0263007 A1 | 10/2010 | Zhang et al. |
| 2011/0116500 A1 | 5/2011 | Petry et al. |

FOREIGN PATENT DOCUMENTS

| | | |
|---|---|---|
| CN | 1905502 A | 1/2007 |
| CN | 101001472 A | 7/2007 |
| CN | 101150492 A | 3/2008 |
| CN | 101283566 A | 10/2008 |
| CN | 101809954 A | 8/2010 |
| CN | 102265701 A | 11/2011 |
| EP | 1 125 413 A1 | 8/2001 |
| EP | 1 691 505 A2 | 8/2006 |
| EP | 1 936 908 A1 | 6/2008 |
| EP | 2 061 180 A1 | 5/2009 |
| JP | 2001-148853 A | 5/2001 |
| JP | 2004-254281 A | 9/2004 |
| JP | 2004-266741 A | 9/2004 |
| JP | 2007-288491 A | 11/2007 |
| JP | 2008-546307 A | 12/2008 |
| JP | 2009-505515 A | 2/2009 |
| JP | 2009-505516 A | 2/2009 |
| JP | 2009-509432 A | 3/2009 |
| JP | 2010-246120 A | 10/2010 |
| KR | 10-0706968 B1 | 4/2007 |
| KR | 10-2007-0082671 A | 8/2007 |
| KR | 10-2008-0045276 A | 5/2008 |
| WO | 2007/081108 A1 | 7/2007 |

OTHER PUBLICATIONS

Wantanabe; MPEG and Internet communication to understand streaming technique Art of the "core"; Chapter 3 element technology Sec. 1 video compression; Embedded press, vol. 12; Sep. 1, 2008; p. 65-80; Japan.

Convenor; Liaison Statement on MMT; 3GPP TSG-SA4#58 meeting; Tdoc S4 (10)0296; International Organisation for Standardisation; Organisation Internationale de Normalisation; ISO/IEC JTC1/SC29/WG11; Coding of Moving Pictures and Audio; Apr. 26-30, 2010; p. 1-25; Kyoto, Japan.

Korean Office Action dated Mar. 26, 2019, issued in Korean Patent Application No. 10-2018-7025076.

Japanese Office Action dated May 24, 2019, issued in Japanese Patent Application No. 2018-156141.

Japanese Office Action with English translation dated Aug. 11, 2020; Japanese Appln. No. 2019-190276.

Chinese Office Action with English translation dated Nov. 26, 2020; Chinese Appln. No. 201811466785.6.

APPARATUS AND METHOD FOR TRANSMITTING MULTIMEDIA DATA IN A BROADCAST SYSTEM

CROSS-REFERENCE TO RELATED APPLICATIONS

This application is a continuation application of prior application Ser. No. 16/148,140, filed Oct. 1, 2018, which is a continuation application of prior application Ser. No. 13/980,462, filed on Jul. 18, 2013, which was based on National Stage application under 35 U.S.C. § 371 of an International application number PCT/KR2012/000468, filed on Jan. 19, 2012, which was based on and claimed priority under 35 U.S.C. § 365(b) of a Korean patent application number 10-2011-0005654, filed on Jan. 19, 2011 in the Korean Intellectual Property Office, the disclosure of each of which is incorporated by reference herein in their entireties.

TECHNICAL FIELD

The present disclosure relates to an apparatus and method for transmitting multimedia data in a broadcast system. More particularly, the present disclosure relates to an apparatus and method for transmitting multimedia data via a heterogeneous network in a broadcast system that supports an Internet-protocol-based multimedia service.

BACKGROUND

A broadcast network of the related art generally uses a Moving Picture Experts Group-2 Transport Stream (MPEG-2 TS) for transmission of multimedia contents. That is, the MPEG-2 TS is used as a representative transmission technique for transmitting a bitstream in which a plurality of broadcast programs (a number of encoded video bit streams) are multiplexed in an erroneous transmission environment. For example, the MPEG-2 TS is suitable for use in digital TV broadcasting of the multimedia era.

FIG. 1 illustrates a hierarchical structure for supporting the MPEG-2 TS according to the related art.

Referring to FIG. 1, layers for supporting the MPEG-2 TS include a media coding layer (MEDIA CODING LAYER) 110, a synchronization layer (SYNC LAYER) 120, a delivery layer (DELIVERY LAYER) 130, a network layer (NETWORK LAYER) 140, data link layer (DATA LINK LAYER) 150, and a physical layer (PHYSICAL LAYER) 160.

The media coding layer (MEDIA CODING LAYER) 110 and the synchronization layer (SYNC LAYER) 120 are constructed in a format that facilitates use of media data as the basic unit of recording or transmission. The delivery layer (DELIVERY LAYER) 130, the network layer (NETWORK LAYER) 140, the data link layer (DATA LINK LAYER) 150, and the physical layer (PHYSICAL LAYER) 160 construct a multimedia frame for recording of a data block in a format constructed by the synchronization layer (SYNC LAYER) 120 in a separate recording medium or for transmission of the data block. The constructed multimedia frame is transmitted to a subscriber terminal through a predetermined network. To this end, the synchronization layer (SYNC LAYER) 120 is constructed by a fragmentation block (FRAGMENT BLOCK) 122 and an access unit (ACCESS UNIT) 124, and the delivery layer (DELIVERY LAYER) 130 is constructed by an MPEG-2 TS/MP4 RTP Payload Format/Flute 132, an RTP/HTTP 134, and an UDP/TCP 136.

However, the MPEG-2 TS has several limitations in supporting multimedia services. The limitations of the MPEG-2 TS is one-way communication, inefficiency in transmission due to a fixed frame size, a specialized transmission protocol for audio/video, and a generation of unnecessary overhead in a transmission using Internet Protocols (IPs).

Thus, in order to overcome the limitations of the MPEG-2 TS, the MPEG MEDIA Transport (MMT) standard is newly suggested as one of multimedia transmission techniques for supporting multimedia services based on the MPEG technology. For example, the MMT standard may be applied to efficiently transmit hybrid contents through a heterogeneous network. Herein, the hybrid contents denote a set of contents having multimedia elements based on video/audio/application. The heterogeneous network denotes networks in which a broadcast network and a communication network coexist.

The MMT standard aims at defining a more friendly transmission technique for the IP that is a basic technique in a transmission network for the multimedia services. Hence, the MMT standard is intended to provide an efficient MPEG transmission technique in a multimedia service environment that changes based on the IP, and is steadily studied and standardized. In particular, for the MMT standard in a recent multimedia service environment that provides a hybrid network and hybrid contents, a need exists for a plan for providing an efficient MPEG transmission technique.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for transmitting multimedia data through a heterogeneous network in a broadcast system that supports an Internet-protocol-based multimedia service.

Another aspect of the present disclosure is to provide a method and apparatus for transmitting multimedia data by constructing a payload of a multimedia frame to provide hybrid content or a hybrid service based on the MMT technology.

Another aspect of the present disclosure is to provide a method and apparatus for constructing a header region and a data region of an MMT access unit to construct a payload of a multimedia frame for providing hybrid content or a hybrid service based on the MMT technology.

In accordance with an aspect of the present disclosure, a method for constructing a payload of a multimedia frame to be transmitted via a heterogeneous network in a broadcast system that supports an Internet-protocol-based multimedia service is provided. The method includes dividing data so as to transmit data of at least one media type and constructing a data region based on the divided data, constructing a header region including at least one of information on the state of the data included in the data region and/or information on the data region, and combining the data region and the header region to construct a payload for the multimedia frame.

In accordance with another aspect of the present disclosure, an apparatus for constructing a payload of a multimedia frame to be transmitted via a heterogeneous network in a broadcast system that supports an Internet-protocol-based multimedia service is provided. The apparatus includes a data region construction unit for dividing data so as to transmit data of at least one media type and constructing a data region based on the divided data, a header region construction unit for constructing a header region including at least one of information on the state of the data included in the data region and/or information on the data region, and a payload construction unit for combining the data region and the header region to construct a payload for the multimedia frame.

The present disclosure may support efficient MPEG transmission in a multimedia environment by providing a hybrid service or content via a heterogeneous network.

The present disclosure may also provide high-quality content, hybrid content, and a heterogeneous network.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiment of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
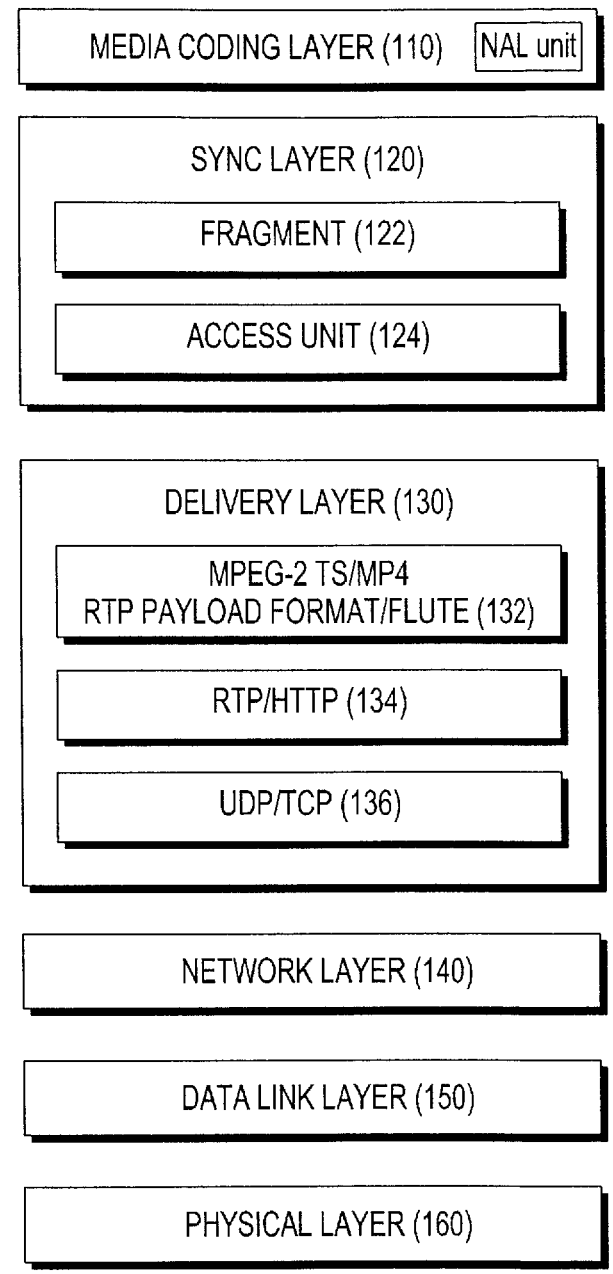
FIG. 1 illustrates a conventional hierarchical structure for supporting a Moving Picture Experts Group-2 Transport Stream (MPEG-2 TS) according to the related art.
Figure 2:
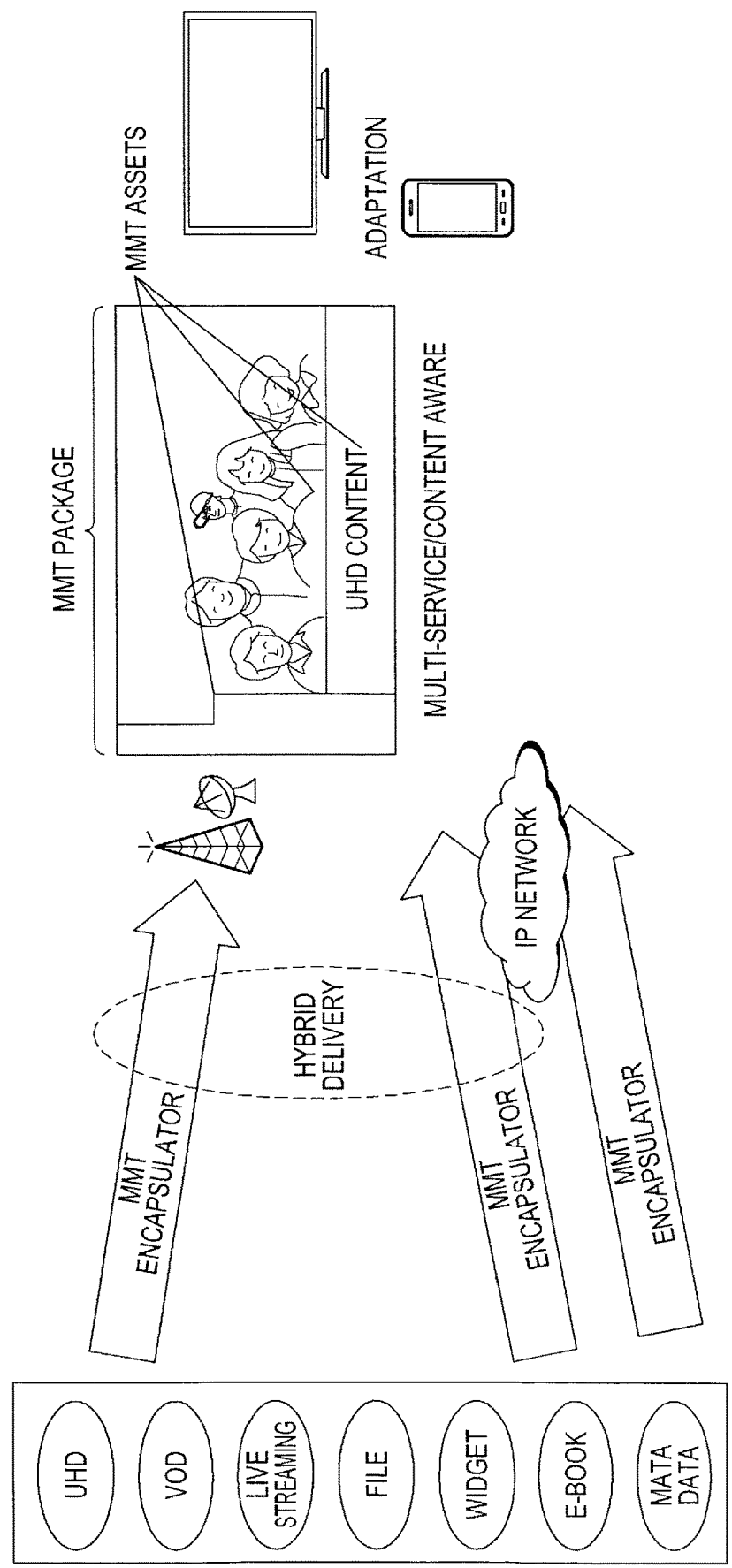
FIG. 2 illustrates a concept of an MPEG MEDIA Transport (MMT) service by a broadcast system based on the MMT standard according to an embodiment of the present disclosure.

FIG. 2 illustrates a concept of an MPEG MEDIA Transport (MMT) service by a broadcast system based on the MMT standard according to an embodiment of the present disclosure. Hereinafter, the MMT standard will be referred to as an 'MMT' system.

Referring to FIG. 2, contents for the MMT service may include Ultra High Definition (MD), Video On Demand (VOD), live streaming, files, widgets, E-books, and metadata. However, the content for the MMT service may include any content that may be expressed in an electric signal.

To construct a multimedia frame, multimedia data corresponding to each of various contents are encapsulated in a predetermined format by an MMT Encapsulator (ME), and the multimedia frame is transmitted to a subscriber terminal via a hybrid delivery over a heterogeneous network. The heterogeneous network denotes a network having a transmission environment where a broadcast network and an IP network coexist. The multimedia frame is a transport frame for the MMT service, and is a packet of an MMT access unit.

The subscriber terminal (adaptation) having received the multimedia frame transmitted in the hybrid delivery through the heterogeneous network extracts multimedia data corresponding to desired content from the multimedia frame, and provides a video/audio/application to a user based on the extracted multimedia data. Each multimedia data corresponding to the video/audio/application provided for a specific content is defined as an 'MMT asset'. The subscriber terminal may include any terminal that can support a multimedia service. A representative example of the subscriber terminal may include an IP TV or a smart phone.

Figure 3:
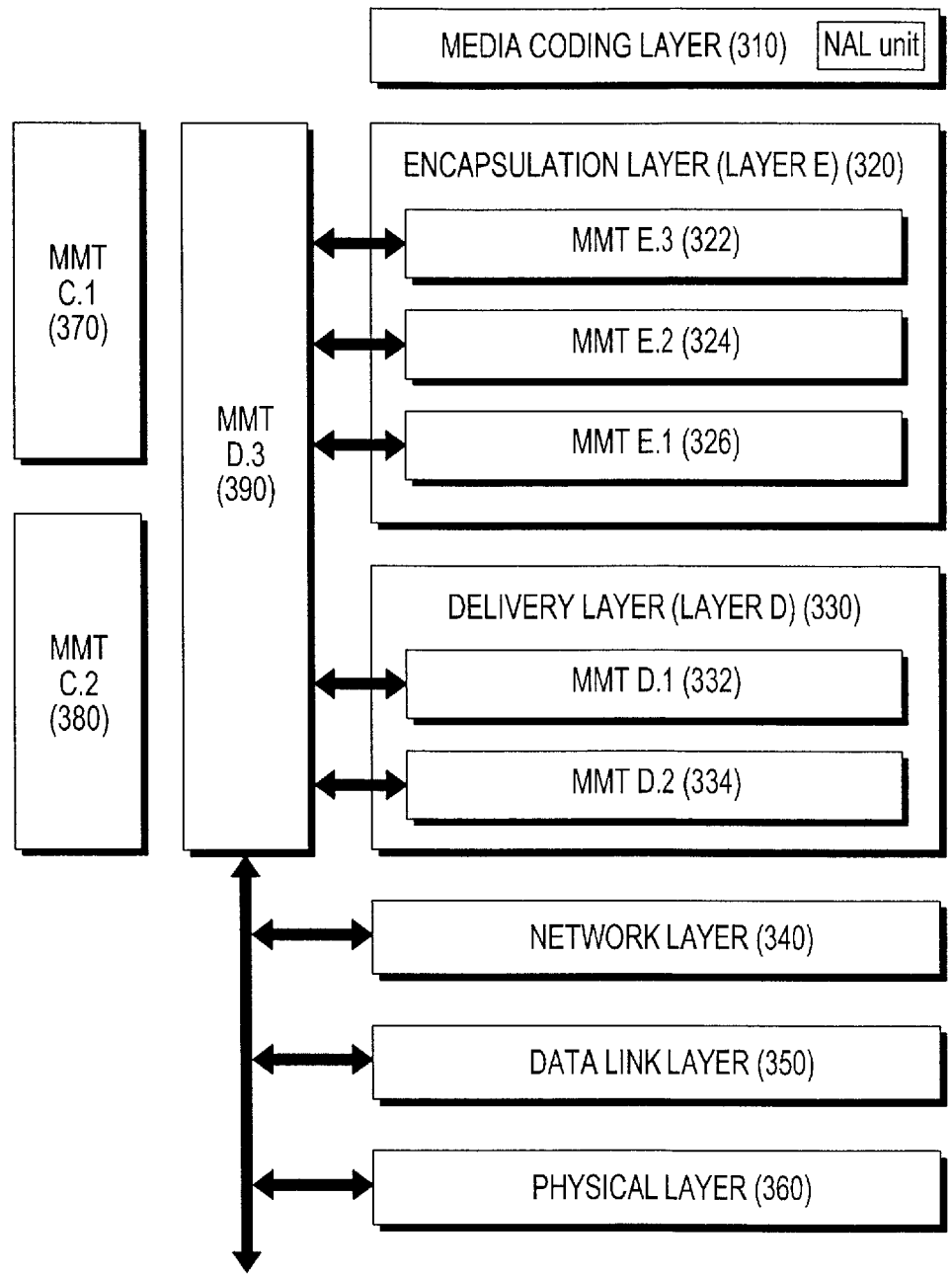
FIG. 3 illustrates a hierarchical structure of layers for transmitting multimedia data corresponding to multi-service/content via a heterogeneous network in an MMT system according to an embodiment of the present disclosure.

FIG. 3 illustrates a hierarchical structure of layers for transmitting multimedia data corresponding to multi-service/content over a heterogeneous network in an MMT system according to an embodiment of the present disclosure.

Referring to FIG. 3, seven layers are required for transmitting a constructed multimedia frame. The seven layers include a media coding layer (MEDIA CODING LAYER) 310, an encapsulation layer (ENCAPSULATION LAYER, hereinafter, referred to as a "Layer E") 320, a delivery layer (DELIVERY LAYER, hereinafter, referred to as a "Layer D" or a "Layer T") 330 or 390, a network layer (NETWORK LAYER) 340, a data link layer (DATA LINK LAYER) 350, a physical layer (PHYSICAL LAYER) 360, and a control layer (CONTROL LAYER, hereinafter, referred to as a "Layer C") 370 and 380.

According to an embodiment of the present disclosure, multimedia data according to a multi-content or a multi-service is generated by the media coding layer (MEDIA CODING LAYER) 310 and the Layer E 320, so that the two layers may be considered as elements of a "multimedia data generation part". A multimedia frame is constructed by the Layer D 330, so that the Layer D 300 may be considered as an element of a "multimedia frame construction part". The Layer D 330 included in the multimedia frame construction part includes header information containing a frame identifier and information required for measuring a quality of a connection service between network layers and end-to-end network capabilities, and constructs a multimedia frame by combining the header information and multimedia data.

Technology areas corresponding to three layers among the seven layers are important for the MMT standard. The three technology areas correspond to the Layer E 320, the Layer D 330 and 390, and the Layer C 370 and 380, respectively. The Layer E 320 plays a role of generating hybrid content, the Layer D 330 and 390 plays a role of efficiently transmitting the generated content through a heterogeneous network, and the Layer C 370 and 380 plays a role for general control in consumption management and transmission management of the hybrid content.

The Layer E 320 includes an MMT E.3 layer 322, an MMT E.2 layer 324, and an MMT E.1 layer 326. The MMT E.3 layer 322 receives an input of coded multimedia data provided from the media coding layer 310 and generates a data fragment which is the basic unit for the MMT service. The MMT E.2 layer 324 generates an Access Unit (AU) for the MMT service based on the data fragment generated by the MMT E.3 layer 322. The MMT E.1 layer 326 generates a format for generation, storage, and transmission of the hybrid content through a combination or a division of the AUs provided by the MMT E.2 layer 324. The MMT E.1 layer 326 transmits MMT asset information to the MMT C.1 layer 370 to help the MMT C.1 layer 370 set an AU, and transmits ME information to the MMT C.1 layer 370 to guarantee Quality of Service (QoS) of the ME.

The Layer D 330 and 390 includes an MMT D.1 layer 332, an MMT D.2 layer 334, and an MMT D.3 layer 390. The MMT D.1 layer 332 corresponds to an Application Protocol (AP) performing a similar role as the Real-time Transfer Protocol (RTP) or the HyperText Transfer Protocol (HTTP). The MMT D.2 layer 334 corresponds to a network layer protocol performing a similar role as the User Datagram Protocol (UDP) or the Transmission Control Protocol (TCP). The MMT D.3 layer 390 performs an operation for an optimization between respective layers included in the Layer E 320 and respective layers included in the Layer D 330.

The Layer C 370 and 380 includes an MMT C.1 layer 370 and a MMT C.2 layer 380. The MMT C.1 layer 370 provides information on generation and consumption of hybrid content and the MMT C.2 layer 380 provides information on transmission of the hybrid content. The MMT C.1 layer 370 transmits service discovery information required for guaranteeing the QoS of the ME to the MMT D1 layer 332. The service discovery information includes application layer Forward Error Correction (FEC) and session description such as security information. The MMT C.1 layer 370 also requests delivery of the ME from the MMT D1 layer 332.

In the present disclosure, to transmit the ME in the Layer D 330 and 390, the ME may include AUs that are basic units of the Layer D 330 and 390. Each AU may be split into multiple fragments and according to a size, several AUs may be aggregated to form a multimedia frame for transmission.

In the Layer D 330 and 390, the ME is transmitted using an MMT Access Unit (MAU). The MAU is the smallest data entity for transmission and forms a payload of a multimedia frame. The MAU is significantly efficient and simple as the AU, and the ME may be split into two or more fragments in the MAU. The MAU permits interleaving for transmission as an option.

An MAU transmits an ME at a possible bit rate and to transmit a particular ME, a minimum configuration is required. To allow simple designing, specific modes may be considered for transmission of MEs except for a dedicated receiver, and for example, MMT streams modes may be considered as well as a generic mode available for transmission of a particular MMT stream. In addition, for future transmission of information associated with an additional system, an auxiliary field may be constructed to transmit any data.

Most Internet Protocol (IP) networks have quite small Maximum Transmission Unit (MTU) sizes. Thus, a payload format of a frame permits fragmentation of an MAU, and one MAU may be fragmented for transmission through a payload of a multimedia frame. As a result of the fragmentation, if the multimedia frame is lost during transmission, an MAU fragment, instead of the entire MAU, may be lost.

In the MMT system, for simplification of operations of receivers, a multimedia frame may carry one or two or more complete MAUs or a single fragment of one MAU. In case of live streaming or Video On Demand (VOD) transmission, an MAU may be fragmented into a same size, and for file transmission, an MAU may be fragmented into an arbitrary size.

When a multimedia frame carries adjacent sequences between MAUs, the user may regard a loss of the multimedia frame as a decoding gap. Therefore, it is preferable but not necessary to allow access units to be interleaved in RTP packets, and for usual cost and execution complexity in latency, great error resiliency may be achieved with respect to a packet loss.

One MAU may transmit multiple AUs. The AUs may have a variable size as well as a fixed size in octets. To parse variously concatenated AUs in one multimedia frame, the size of each AU is known to a receiver. In concatenation for a constant AU size, this size is transmitted out-of-band through a Multipurpose Internet Mail Extensions (MIME) format parameter. In concatenation for variable size AUs, an MAU transmits each AU size in-band.

When multiple AUs are carried in one multimedia frame to simplify operations of receivers in the MMT system, a number of each AU needs to be included in the multimedia frame. Also, for selective interleaving of an AU, a payload format of the multimedia frame includes index information transmitted to the AU. In the MMT system, a server provides receivers with information regarding a buffer resource for allocation for de-interleaving, and then selects an interleaving pattern freely without transmitting the information prior to the receivers, thus dynamically adopting an interleaving pattern based on an AU size and an error rate.

As such, an MAU is usefully used in the MMT system, and herein below, the MAU will be described in detail.

First, as for a structure of the MAU, the MAU includes an MAU header in a header region and an MMT payload in a data region as shown in Table 1. The MAU header includes information about data of the MMT payload, and the MMT payload includes an AU of an ME. Table 1 below shows a structure of the MAU.

TABLE 1

| MAU Header | MMT Payload |
| --- | --- |

Table 2 below shows the information included in the MAU header.

TABLE 2

| bits | 0-15 | 16-31 |
|---|---|---|
| 0 | packetType | sourceportNumber |
| 32 | destinationportNumber | length |
| 64 | numberofItems | sequenceNumber |
| 96 | Timestamp | Indicator of MAU |

Table 2 shows an example of a 127 bit MAU header. The information included in the MAU header composed of 127 bits, includes various fields and each field indicates particular information by using 15 bits. A first field ($0^{th}$ through $15^{th}$ bits) indicates a packet type (packetType), a second field ($16^{th}$ through $31^{st}$ bits) indicates a source port number (sourceportNumber), a third field ($32^{nd}$ through $47^{th}$ bits) indicates a destination port number (destinationportNumber), a fourth field ($48^{th}$ through $63^{rd}$ bits) indicates length (length), a fifth field ($64^{th}$ through $79^{th}$ bits) indicates a number of items (numberofItems), a sixth field ($80^{th}$ through $95^{th}$ bits) indicates a sequence number (sequenceNumber), a seventh field ($96^{th}$ through $111^{th}$ bits) indicates a timestamp (Timestamp), and an eighth field ($112^{th}$ through $127^{th}$ bits) indicates an indicator of an MAU. Hereinafter, detailed contents indicated by the foregoing information will be described.

A field indicating a packet type indicates a state of data included in the MMT payload. That is, when an ME is divided into a plurality of blocks and each block is transmitted using an MAU, the field indicates whether one block is completely included in the MMT payload, whether the block is divided and thus some of the block is included in the MMT payload, or whether a plurality of blocks are included.

The packet type includes a Type of an MAU (TM) and Fragment Information (FI). The TM indicates the type of the MAU by using one bit, and indicates a type of a payload, such as transmission type or control type. If the TM is set to 1, the TM indicates that the MAU includes an MMT control message. The FI indicates information about a fragment included in the MMT payload by using 2 bits. That is, if a block of the ME is fragmented and included in the MMT payload, the FI indicates information about the fragment. For example, the FI may be indicated as shown in Table 3.

TABLE 3

| FI | Fragment State |
|---|---|
| 00 | No Fragment |
| 01 | First Fragment |
| 10 | Other Fragment than First Fragment and Last Fragment |
| 11 | Last Fragment |

In Table 3, (00) indicates that a fragment of a block of the ME is not included in the MMT payload and a complete block is included in the MMT payload. (01) indicates that the first fragment of the ME is included in the MMT payload, (10) indicates that a fragment other than the first fragment and the last fragment among fragments of the block of the ME are included in the MMT payload, and (11) indicates that the last fragment of the block of the ME is included in the MMT payload.

A field regarding a source port number indicates a port of a transmitter, and in a specific case, a port for response is assumed. If a field corresponding to the source port number is not used, the number is 0. If a source host is a client, the port number is a temporary port number, and if the source host is a server, the port number is a well-known port number.

A field regarding a destination port number indicates a port of a receiver. If the client is a destination host, the port number is a temporary port number like the source port number, and if the destination host is a server, the port number is a well-known port number.

A field regarding a length indicates a length of a payload (a header and data). The minimum length is a length of the header and thus is 8 bytes. The size of the field indicating the length is theoretically limited to 65535 bytes (8-byte header+65,527-byte data). An actual limitation of a data length forced by the basic Ipv4 protocol is 65,507 bytes (65,487-byte MAU header, 20-byte IP header).

A field regarding the number of items indicates related information when any one block of an ME is included in an MMT payload or a plurality of blocks are aggregated.

For example, if the ME is divided into a plurality of blocks, any one of which is included in the MMT payload, then the field indicates the order of the block included in the MMT payload or a number of remaining blocks. If a plurality of blocks are aggregated, the field indicates the number of blocks. In this case, each of the plurality of blocks may be related with media data of a different type. The semantic of the field regarding the number of items depends on a frame type.

A field regarding a sequence number increases one by one for each MAU and is transmitted, and is used in the receiver to detect an MAU loss. The MMT system does not perform any operation with respect to a packet loss, and an operation with respect to the packet loss is recorded in an application. According to a document that is a basis for a transmission method using an RTP such as Request For Comments (RFC) 3550, an initial value of a sequence number needs to be arbitrarily determined for plain text attacks that are well known in more difficult encryption. The MMT system may detect a lost MAU by using a sequence number, although not guaranteeing safety of transmission.

A field regarding a timestamp indicates a particular time in which data is generated or changed.

A field regarding an MAU's indicator includes an indicator for a transmission service. For example, the field may include a service protection indicator and an application layer FEC indicator as a flag. When the MAU indicator is indicated using 2 bits, (00) indicates service protection, (01) indicates an application layer FEC, and (10) and (11) may be used to indicate different contents.

Figure 4:
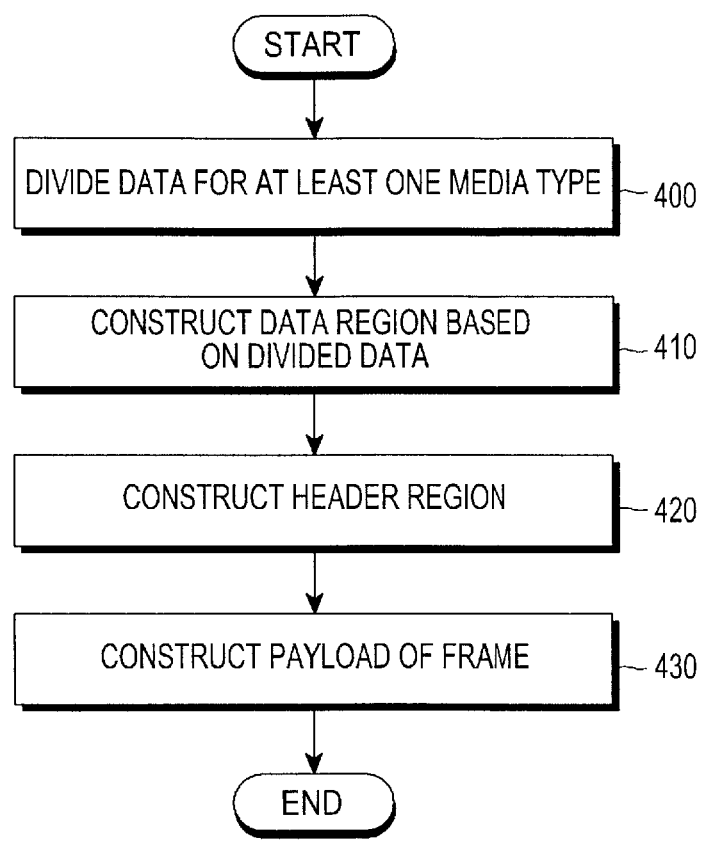
FIG. 4 is a flowchart for constructing a payload of a multimedia frame corresponding to a multi-service/content and transmitting the payload of the multimedia frame over a heterogeneous network in an MMT system according to an embodiment of the present disclosure.

FIG. 4 is a flowchart for constructing a payload of a multimedia frame corresponding to a multi-service/content and transmitting the payload of the multimedia frame over a heterogeneous network in an MMT system according to an embodiment of the present disclosure.

Particularly, FIG. 4 shows an operation performed in the MMT D.1 layer 332 of the Layer D 330 among the layers illustrated in FIG. 3.

Referring to FIG. 4, to transmit multimedia data, the ME is divided into a plurality of blocks at operation 400. The MMT payload of the MAU is constructed using the divided blocks, and the MMT payload may include any one block or a fragment of any one block or the plurality of blocks at operation 410. Once the MMT payload is constructed, the MAU header is constructed by including information regarding data included in the MMT payload or MMT payload information related to the service protection indicator or the application layer FEC at operation 420. Once the MAU header and the MMT payload are constructed, the MAU header and the MMT payload are combined to construct a payload of the frame at operation 430. The payload of the constructed frame is combined with the header of the frame for transmission in one frame.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving media data in a broadcasting system, the method comprising:
    receiving a packet including a packet header and a packet payload of media data,
    wherein the packet payload comprises:
        a data unit generated from the media data,
        a fragmentation indicator indicating information about fragmentation of the data unit in the packet payload,
        length information on the packet payload,
        aggregation information on whether more than one data unit is comprised, and
        sequence number information on the data unit,
    wherein, if the data unit is fragmented, the packet payload comprises a fragmented data unit and the fragmentation indicator indicates information which part of the data unit is included in the packet payload, and
    wherein, if the data unit is not fragmented, the packet payload comprises at least one complete data unit and the fragmentation indicator indicates that the packet payload includes the at least one complete data unit.

2. The method of claim 1, wherein if the data unit is fragmented, the information of the part of the data unit is one of: a first fragment, a last fragment, and other fragment than the first and the last fragment.

* * * * *